2,929,737
COATED TEXTILES AND METHOD OF PRODUCING THE SAME

Wilhelm Tischbein, Leverkusen, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Application August 10, 1954
Serial No. 448,991

Claims priority, application Germany August 13, 1953

11 Claims. (Cl. 117—76)

The present invention relates to a process of coating textiles, particularly synthetic textiles, with vinyl chloride polymers and to the resulting products.

It is known in the art to provide textile such as nylon, rayon, glass or other woven or unwoven fabrics or fibers with a coating of polyvinyl chloride, but these products are subject to numerous disadvantages due to the poor adhesion between the polyvinyl chloride and the textile base.

Therefore, it is an object of the present invention to provide an improved process of coating textiles, particularly synthetic textiles, with vinyl chloride polymers.

Another object of the invention is to provide an improved process of coating textiles, particularly synthetic textiles, with plasticized vinyl chloride polymers.

An additional object of the invention is to provide a new and highly useful vinyl chloride polymer coated fabric.

A further object of the invention is to provide a plasticized vinyl chloride polymer coated flexible fabric having superior bonding action between the coating and the fabric base.

Other objects will appear hereinafter as the description of the invention proceeds.

In accordance with the present invention, textiles of all kinds, particularly synthetic textiles, are provided with a plasticized or unplasticized vinyl polymer coating which is bonded tenaciously to the textile base material. This excellent bonding action is obtained by pretreating the textile material with a solution of a polyester containing hydroxyl or carboxyl end groups and then applying to the pretreated material a coating comprising a plasticized or unplasticized vinyl chloride polymer containing a polyisocyanate. The coating thus applied is dried and finally cured, preferably by heating.

The invention is illustrated further by the following example without being restricted thereto:

Example

A polyamide fabric is pretreated by spraying with a 5% solution in butyl acetate of a linear polyester prepared from adipic acid and 1,6-hexanediol, which polyester contains 0.6% hydroxyl groups and has an acid number of 19. After evaporation of the solvent, the pretreated fabric is coated with plasticized polyvinyl chloride containing toluylene diisocyanate distributed therein in a finely divided state.

The polyvinyl chloride composition used as the coating material is prepared by intimately mixing 5–10% by weight of toluylene diisocyanate with a paste of plasticized polyvinyl chloride consisting of 60 parts of polyvinyl chloride and 40 parts of dibutyl phthalate. This paste may contain dyestuffs (previously dried), pigments and any other suitable additives.

After drying the coated fabric for 5 minutes at 120° C., the resulting product is immediately coated a second and a third time with plasticized polyvinyl chloride which may or may not contain toluylene diisocyanate. The coated fabric is dried after each coating operation and finally cured by heating to about 160° to about 170° C. for about 3 to 5 minutes.

In place of the above polyester from adipic acid and 1,6-hexanediol the following polyesters may be used:

(a) Polyester from 3 mols of adipic acid, 1 mol of hexanediol, 1 mol of 1,3-butylene glycol, 1 mol of diethylene glycol and 1 mol of trimethylol propane.

(b) Polyester from 6 mols of adipic acid, 6 mols of hexanediol and 1 mol of trimethylol propane.

(c) Polyester from 3 mols of adipic acid, 1 mol of hexanediol, 1 mol of 1,3-butylene glycol, 1.75 mol of diethylene glycol and 0.25 mol of trimethylol propane.

In place of toluylene diisocyanate the following polyisocyanates may be used:

(a) 1,4-diisocyanato cyclohexane
(b) p,p'-Diphenyl methane diisocyanate

The polyesters containing hydroxyl and/or carboxyl groups, which are used in the pretreatment step, are prepared by esterifying polycarboxylic acids with polyhydric alcohols, one of the reactants being employed in an excess. Hydroxycarboxylic acids may also be used in the production of the polyesters.

Illustrative examples of suitable compounds for plasticizing vinyl chloride polymers are dibutyl phthalate, dioctyl phthalate, tricresyl phosphate, paraffin phenyl sulfonate, neutral phthalic acid ester of the monobutyl ether of ethylene glycol, and benzyloctyl adipate, etc.

As a solvent for the polyester, there may be used ethyl acetate, butyl acetate, methylene chloride, trichloroethylene, xylene, acetone, and the like.

The plasticized or unplasticized vinyl chloride polymer containing a polyisocyanate is applied as a coating to one or both sides of the textile base by any suitable method such as by brushing, spraying or dipping. If it is desired to apply a plurality of coatings, it is sufficient to incorporate the polyisocyanate with the polyvinyl chloride used in the initial coating operation. However, it is within the scope of the invention to include the polyisocyanate in the polyvinyl chloride used in the initial coating and one or more of the subsequent coatings.

The expression "vinyl chloride polymer," as used in the specification and claims, covers homopolymers, copolymers and interpolymers of vinyl chloride in which vinyl chloride is the major constituent. Examples of these are polyvinyl chloride, copolymers of vinyl chloride with vinyl acetate, unsymmetrical dichloroethylene, styrene, acrylic and methacrylic esters, dimethyl fumarate, diethyl fumarate and other materials copolymerizable or interpolymerizable with vinyl chloride.

The coated products of the instant inventions find use in the manufacture of raincoats, tents, awnings, canvas, and the like.

What I claim is:

1. In a process of coating a textile with a vinyl chloride polymer, the improved method of bonding the latter to the textile which comprises pre-treating the textile with a solution containing essentially a polyester prepared from a polycarboxylic acid and a polyhydric alcohol, then applying to the pre-treated textile a coating consisting essentially of a vinylchloride polymer containing a polyisocyanate, and curing the resulting product, whereby the polyisocyanate in the topcoat forms a reaction product with the polyester in the precoat.

2. Process of claim 1 wherein said vinyl chloride polymer is a plasticized vinyl chloride polymer.

3. In a process of coating a textile with a vinylchloride polymer, the improved method of bonding the latter to the textile which comprises pre-treating said textile with a solution consisting essentially of a polyester of a polycarboxylic acid and a polyhydric alcohol in an organic solvent, drying said pretreated textile, coating said dried pretreated textile with a composition consisting essentially of a vinylchloride polymer containing a polyisocyanate, and curing the resulting product by heating, whereby the polyisocyanate in the topcoat forms a reaction product with the polyester in the precoat.

4. Process of claim 3 wherein the vinyl chloride polymer is a plasticized polymer.

5. Process of claim 3 wherein the textile is a synthetic textile.

6. In a process of coating a polyamide textile fabric with a plasticized polyvinylchloride, the improved method of bonding the latter to the fabric which comprises pre-treating said fabric with a solution consisting essentially of a polyester prepared from a polycarboxylic acid and polyhydric alcohol in an organic solvent, drying said pretreated fabric, coating said dried pretreated fabric with a plasticized polyvinylchloride containing a polyisocyanate, and curing the resulting product, whereby the polyisocyanate in the topcoat forms a reaction product with a polyester in the precoat.

7. An article of manufacture comprising a textile base having a coating of vinylchloride polymer bonded thereto, the bonding means comprising (1) an intermediate precoat consisting essentially of a polyester prepared from a polycarboxylic acid and a polyhydric alcohol, and (2) a polyisocyanate incorporated into the vinylchloride polymer, the polyester in the precoat being reacted with the polyisocyanate in the topcoat to form a chemical bond.

8. An article of manufacture comprising a textile base having a coating of vinylchloride polymer united to said base by a bonding means which comprises a polyester prepared from a polycarboxylic acid and polyhydric alcohol applied to said base as the sole precoat, a polyisocyanate being incorporated into the vinylchloride topcoat and reacted with the polyester to form a chemical bond.

9. An article of manufacture comprising a textile base having a coating of a plasticized vinylchloride polymer united to said base by a bonding means which comprises a precoat consisting essentially of a polyester prepared from a polycarboxylic acid and polyhydric alcohol, a polyisocyanate being incorporated into the vinylchloride topcoat and reacted with the polyester to form a chemical bond.

10. An article of manufacture comprising a synthetic textile fabric having a coating of a plasticized vinylchloride polymer united to said base by a bonding means which comprises a precoat consisting essentially of a polyester, prepared from a polycarboxylic acid and a polyhydric alcohol, a polyisocyanate being incorporated into the vinylchloride topcoat and reacted with the polyester to form a chemical bond.

11. An article of manufacture comprising a polyamide textile fabric having a precoat consisting essentially of a polyester prepared from a polycarboxylic acid and polyhydric alcohol and a topcoat of a plasticized vinylchloride polymer, the bonding of the topcoat to the fabric being affected through a chemical bond between the polyester and a polyisocyanate incorporated into the vinylchloride polymer for this purpose.

References Cited in the file of this patent

UNITED STATES PATENTS

| 2,333,922 | Foster | Nov. 9, 1943 |
| 2,430,479 | Pratt et al. | Nov. 11, 1947 |
| 2,555,745 | Hopkins et al. | June 5, 1951 |
| 2,606,162 | Coffey et al. | Aug. 5, 1952 |

FOREIGN PATENTS

| 501,126 | Canada | Mar. 30, 1954 |
| 604,834 | Great Britain | July 12, 1948 |
| 821,934 | Germany | Nov. 22, 1951 |